Dec. 10, 1957 S. J. FIACCO 2,815,590
ROTARY SNOW REMOVAL ATTACHMENT FOR MOTOR VEHICLES
Filed June 11, 1954 4 Sheets-Sheet 1

Sebastian J. Fiacco
INVENTOR.

Dec. 10, 1957 S. J. FIACCO 2,815,590
ROTARY SNOW REMOVAL ATTACHMENT FOR MOTOR VEHICLES
Filed June 11, 1954 4 Sheets-Sheet 2

Sebastian J. Fiacco
INVENTOR.

Dec. 10, 1957   S. J. FIACCO   2,815,590
ROTARY SNOW REMOVAL ATTACHMENT FOR MOTOR VEHICLES
Filed June 11, 1954   4 Sheets-Sheet 3
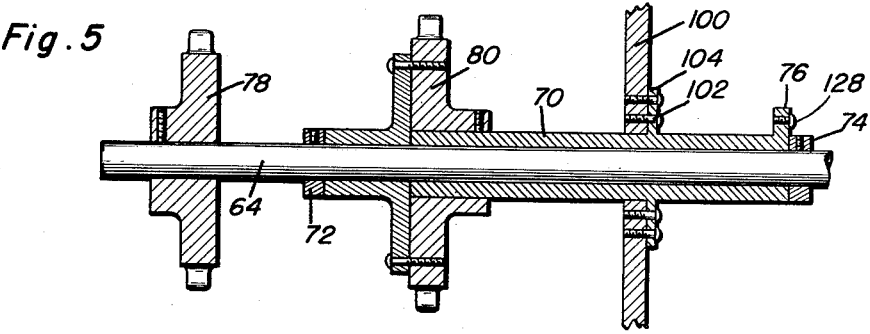
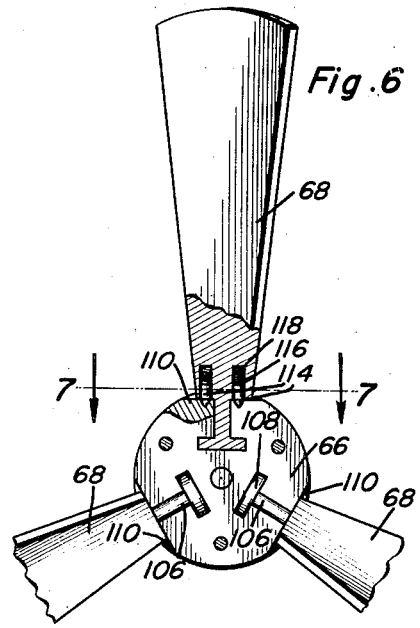
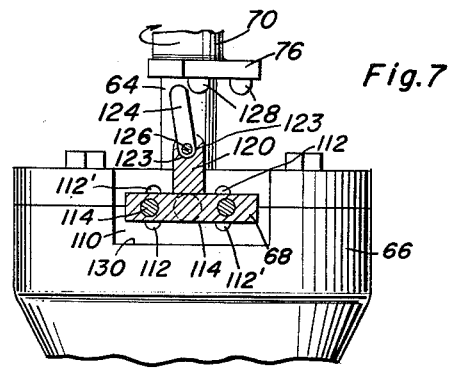
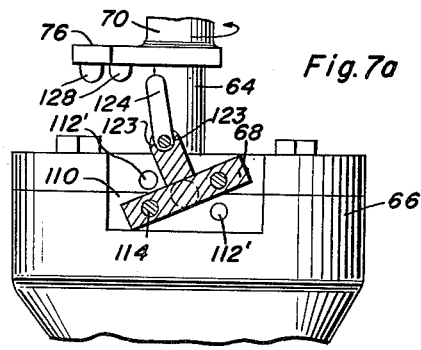
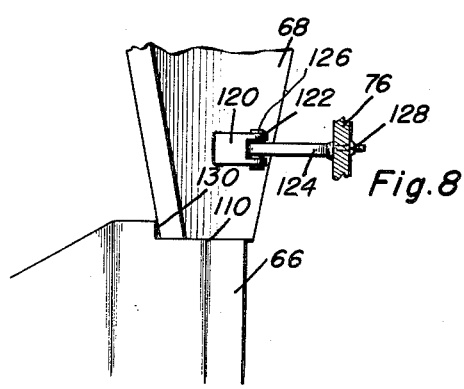
Sebastian J. Fiacco
INVENTOR.

Dec. 10, 1957 S. J. FIACCO 2,815,590
ROTARY SNOW REMOVAL ATTACHMENT FOR MOTOR VEHICLES
Filed June 11, 1954 4 Sheets-Sheet 4

Sebastian J. Fiacco
INVENTOR.

BY *Clarence A. O'Brien*
*and Harvey B. Jackson*
Attorneys

United States Patent Office 2,815,590
Patented Dec. 10, 1957

2,815,590

ROTARY SNOW REMOVAL ATTACHMENT FOR MOTOR VEHICLES

Sebastian J. Fiacco, Norwood, N. Y.

Application June 11, 1954, Serial No. 436,106

2 Claims. (Cl. 37—43)

This invention relates to novel and useful improvements in a snow shovel attachment for motor vehicles and more specifically pertains to a rotary snow plow attachment which may be readily applied to or removed from motor vehicles for converting the same into rotary snow plows.

The principal object of this invention is to provide an improvement in my previous Patent No. 2,603,007, of July 15, 1952, in which novel means are provided for reversing the direction of snow discharged from the attachment.

An important feature of the invention consists in the provision of a supporting frame which may be readily applied to or removed from a motor vehicle as an attachment therefor, and which supporting frame is adjustably and pivotally mounted on a motor vehicle and carries a snow funnel which collects snow during the forward progress of the vehicle and discharges the same into a rotary blower which, in turn, discharges the snow through a discharge conduit in various selected directions according to the rotational direction of the blower.

A further feature of the invention resides in the provision of an apparatus as set forth in the preceding paragraph wherein a common power operated driving means is provided for energizing the blower and for actuating a snow or ice cutter rotatably mounted in the funnel at the forward or inlet end thereof, in advance of the blower.

A still further important feature of the invention resides in the provision of adjustable pitched blade elements on the cutter assembly which are automatically adjusted in pitch in accordance with the rotational direction of the cutter and blower assemblies.

Yet another feature of the invention resides in the provision of safety means inherent in the construction of the variable pitch blades whereby obstructions such as rock and the like will not cause damage to the cutter apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is an enlarged longitudinal section taken through a portion of the driving mechanism;

Figure 6 is an enlarged elevational view partly in section showing the cutter mechanism;

Figure 7 is a sectional view taken approximately on the line 7—7 of Figure 6, and showing an intermediate position of the blades and associated parts when the blades are being adjusted by rotation of one of the shafts as indicated by the arrow;

Figure 7a is a sectional view taken approximately on the same line as Figure 7, but showing the blades after having been adjusted to change the blade angles and just prior to movement of the shafts in such direction (see direction of arrow) to cause another adjustment in the blade angle;

Figure 8 is a side elevational view on the same scale as Figure 7 partly in section showing a portion of the cutter mechanism;

Figure 1:
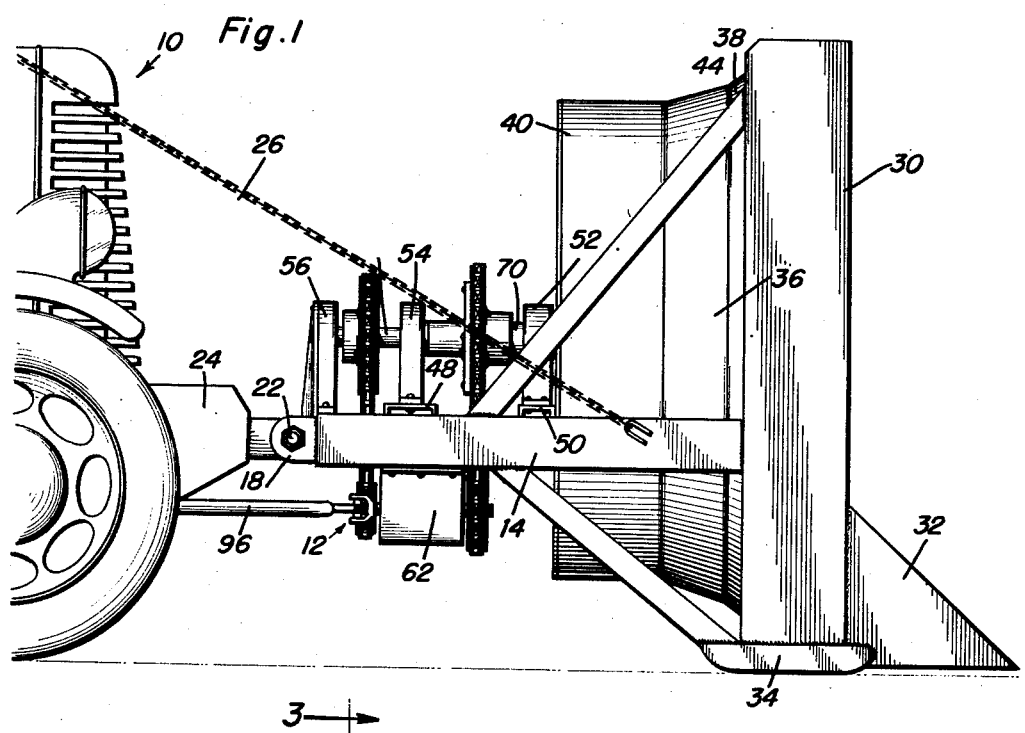
Figure 1 is a side elevational view of the attachment and a portion of the motor vehicle to which it is attached.
Figure 2:
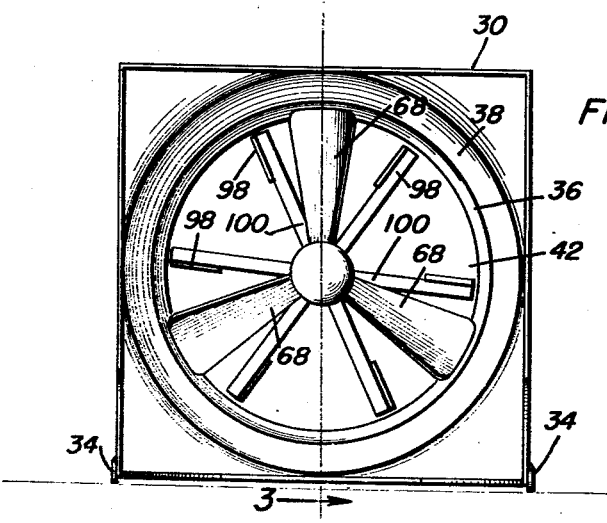
Figure 2 is a front elevational view of the attachment on a reduced scale.
Figure 3:
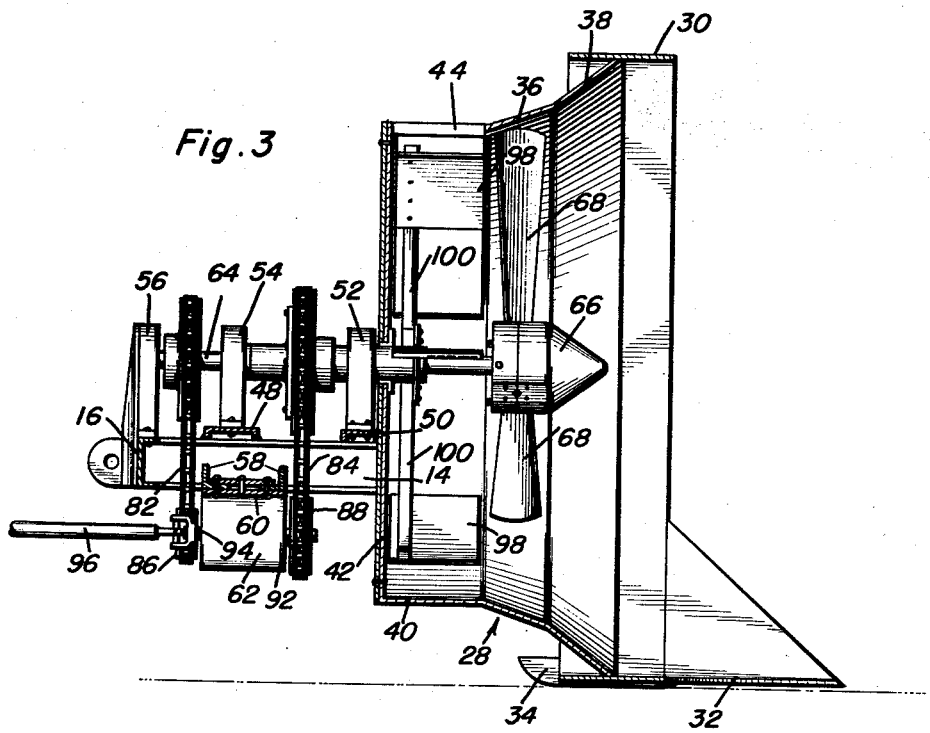
Figure 3 is a longitudinal enlarged vertical section taken substantially along the plane of section line 3—3 in Figure 2.
Figure 4:
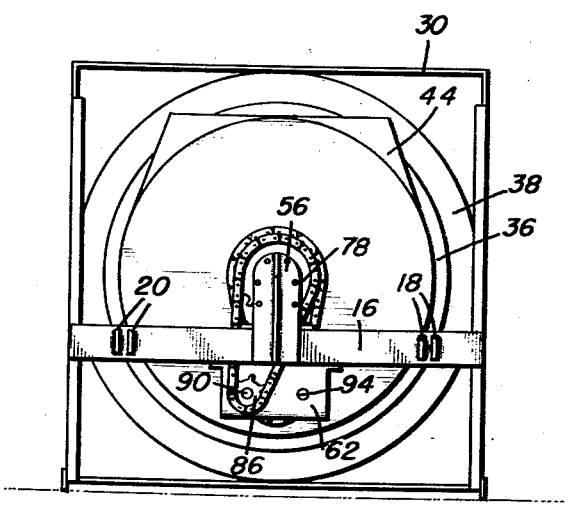
Figure 4 is a rear elevational view of the attachment on the same scale as Figure 3.

Referring now more particularly to Figures 1–4, reference numeral 10 indicates a motor vehicle generally which may be of any conventional type such as is conventionally used by townships, communities and the like for general purpose work. It is to be, of course, understood that the hereinafter described attachment may be secured to any conventional or desired form of motor vehicle provided the latter is provided with suitable power take-off mechanism to effect the drive to the attachment.

The attachment proper consists essentially of a supporting framework communicated generally by the reference character 12 which includes the spaced side members 14 and the rear cross member 16, the latter of which is provided with spaced rearwardly projecting ear members 18 and 20 for the reception of pivot bolt members 22 by means of which the attachment is pivotally secured to the forward end of the frame 24 of the motor vehicle. Any suitable mechanism such as a chain 26 may be connected adjacent the forward ends of the side members 14 and to a winch or other suitable power mechanism on the motor vehicle for raising and lowering the attachment about its pivotal connection 22.

Rigidly secured to the forward ends of the side members 14 is the combined funnel and plow housing indicated generally by the reference character 28 and which includes a rectangular gathering head 30 having a shovel attachment 32 at its lower portion and which is provided at its opposite sides with the runner members 34 for engaging the ground surface and supporting the forward end of the attachment as the same is moved along through the snow, guiding the snow into the gathering head.

The casing assembly further includes a frusto-conical funnel portion 36 which is secured at its forward edge or at the larger diameter end thereof to the gathering head 30 by means of an extension 38. The rearward or smaller diameter end of the funnel 36 is connected to a cylindrical lower housing 40 provided with a rear wall 42 in the manner shown.

The lower housing 40 is provided with an open spout top portion 44 which is adapted to permit the discharge of snow from the housing 40 regardless of direction of the blade and blower structure to be subsequently described. This structure is of a conventional nature being similar to that disclosed in the patent to Ingersoll, No. 2,518,622.

The supporting frame 12 also includes cross member 48 and 50 extending between its opposite side members 14 at the upper edge thereof and upon which pillow blocks or bearing assemblies 52, 54 and 56 are mounted. The frame also includes secured thereon, in any suitable manner, bracket members 58 and 60 which provides hanger means for a gear box assembly indicated by the reference character 62 which depends from the latter mentioned members. A shaft member 64 is aligned with and rotatably received in the bearing assemblies, 52, 54 and 56 and projects forwardly therefrom through the back wall 42 of the blower housing and into the confines of the funnel assembly 36. At this point, a hub member 66 is rigidly secured to the shaft for rotation therewith and it is to be noted that this hub member carries a plurality of radially disposed blade members 68 which operate within the confines of the funnel member adjacent the forward or inlet end thereof in the manner shown most clearly in Figure 3. The aforementioned "blade members" serve as a feed screw on the snow moving over the shovel attachment 32 in a manner to become subsequently apparent.

As seen most clearly in Figure 5, a quill shaft 70 is rotatably received on the shaft 64 and is fixed against longitudinal displacement thereon by suitably secured truss collars 72 and 74 and it is to be noted that this quill shaft extends forwardly along the shaft 64 to a point adjacent the rear face of the hub 66 whereat the quill shaft is provided with a radial flange 76, the purpose of which will be presently apparent. The shaft 64 has a sprocket member 78 rigidly affixed thereto, in any suitable manner, and the quill shaft 70 has a sprocket member 80 secured thereon in any suitable manner, both of which have chain members 82 and 84 trained thereabout and about sprocket members 86 and 88, respectively, carried by drive shafts 90 and 92 of the gear assembly 62. The gear assembly includes an input shaft member 94 which is adapted to be connected to the power take-off shaft 96 driven by the motor vehicle 10 or any other suitable source of power. The particular construction of the gear box 62 forms no part of this invention, however it is to be noted that the output shafts 90 and 92 of the gear assembly will be turned at different rotational speeds, the speed of the shaft 90 being faster than that of the shaft 92, and an additional differential of rotational speed will occur due to the different gear ratios provided by the diameters of the sprockets 86 and 78 on one hand and the sprockets 88 and 90 on the other hand. Thus the speed of rotation of the cutter blades 68 with shaft 64 and the blower paddles 98 connected adjacent the forward end of the quill shaft 70 will be different, the speed of the blower blades or paddles being considerably faster than the cutter blades.

The blower paddles 98 are attached to the quill shaft 70 by means of the radial spoke elements 100 which are secured by suitable fasteners 102 to a radial flange 104 on the quill shaft in the manner shown most clearly in Figure 5.

Referring now more particularly to Figure 6, it will be seen that each of the blades 68 has a longitudinal shaft extension 106 at its inner end which projects into the hub and is provided at its extremity with an enlarged head portion 108 affixed to the blade elements against radial movement with respect to the hub while at the same time permitting rotation of the blade elements about their longitudinal axes to effect a change or reversal in pitch of the blade elements 68 in accordance with the rotational direction of drive to the shaft 64. The hub 66 is flattened as at 110 in the region of attachment of each of the blade members 68 and in this flat surface are provided with pairs of recesses or dentet portions 112 and 112′ each of the pairs corresponding to the two positions of pitch which the blade may attain. To cooperate in holding relationship with these recesses, the cutter blades 68 are provided with spring urged trunnion or detent members 114 received in recesses 116 in the blade and resiliently urged under influence of the coil spring 118 into the detents or recesses 112 or 112′ at the corresponding positions of pitch of the blades.

As seen most clearly in Figures 7 and 7a, there is provided automatic means for effecting reversal of pitch of the blades 68 in response to rotational direction of the drive shafts 64 and 70. This means will be seen to consist of bracket ear elements 120 attached adjacent the inner end of each blade 68, said ear elements including bifurcated end portions 122 between which a cam finger 124 is pivotally received as by a pin 126 for limited pivotal movement thereon between stop portions 123 on the ear elements 120, said stop elements being disposed on opposite sides of the cam elements 124. The cam elements 124 are proportioned to project into the regions adjacent the flange 76 on the forward end of the quill shaft 70. The flange 76 is provided with cam engaging or lifter elements 128 which are adjustably secured thereon for movement toward and away from the hub 66, and which cooperate with the free end of the cam fingers 124 for effecting the reversal of pitch of the blade elements 68, as will be apparent in Figures 7 and 7a.

Referring to Figures 7 and 7a, the operation of the pitch reversing structure is as follows:

It is to be understood, as previously, the blade 68 will be in either the position shown in Figure 7a or the opposite diagonal position wherein detents 114 will be positioned in the recesses 112′. Figure 7 shows the blade position just after the direction of rotation of the shafts 64 and 70 have reversed, as indicated by the arrow, thus this position prior to the reversal of rotation of the shafts, the blade was in the position opposite that shown in Figure 7a. Rotation of the aforementioned shafts in the direction indicated results in the tendency of the blades to "feather" or assume the position indicated in Figure 7 due to the effect of the snow moving thereagainst as well as the effect of the reversal of rotation of the driving shafts. When this occurs, the cam elements 124 due to centrifugal motion will tend to assume a position wherein they will be in the line of travel of the cam engaging elements 128, as shown for example in Figure 7a, whereupon contact with the elements 128 with the cam elements 123 and due to the limited pivotal movement of the cam elements 124, the blade will be urged into the position shown in Figure 7a, wherein the detents 114 will be spring urged into the recesses 112 and the blades will be properly positioned to feed snow into the device.

Figure 7a shows the parts positioned prior to the "adjusting" of the blades upon rotation of the shafts indicated by the arrow thereon. From this position the blades will assume the intermediate position indicated in Figure 7, whereby the cam engaging elements 128 through the cam elements 124 and stops 123 will cause the blade to assume a pitch position opposite to that indicated in Figure 7a, or the original pitch position previously mentioned.

Thus, in order to completely reverse the direction in which the snow is thrown to one side of the machine, the operator need merely reverse the direction of drive to the shafts 64 and 70, and the snow will be thrown out from the spout 44 regardless of the direction of rotation of said shafts. It is to be understood that suitable reversing gear mechanism may be incorporated in the gear box assembly 62 to effect this reversal of drive to the shafts 64 and 70 if desired. It is to be further noted that the flat portions 110 of the hub 66 are so contoured that their rear faces 130 provide stop means for the blade elements 68 in their reversed positions of pitch.

The provision of the spring urged plunger members 114 is very important in permitting flexibility of the blade members 68 or the pitch adjustment thereof which is necessary to prevent breakage or damage to the blade elements should an obstruction such as a rock or the like be encountered. In this respect, it is to be noted that the outer end edges of the blade elements 68 are positioned rather closely to the peripheral surface of the funnel 36 and under circumstances in which an obstruction becomes lodged between the funnel and the outer or tip end of the blade the spring urged plungers 114 will permit momentary deflection of the blade in opposition to the pitch angle to permit the obstruction to pass without damage to either the funnel or the blade elements. The blade elements will, of course, be quickly returned to their normal pitch position by the cam fingers 124 acted upon by the cam engaging elements 128.

Figure 9:
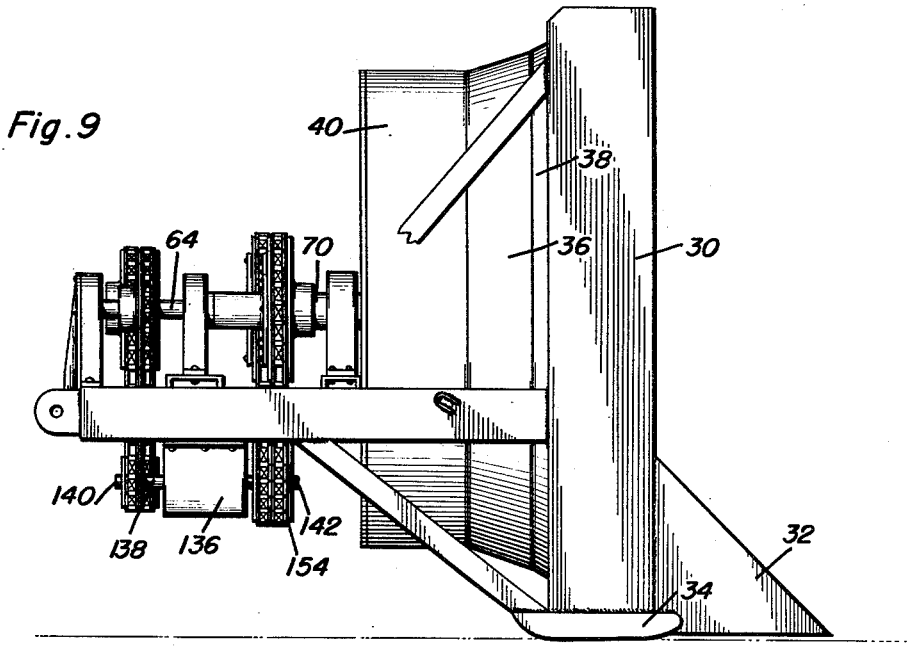
Figure 9 is a side elevational view of a modified form of the invention.
Figure 10:
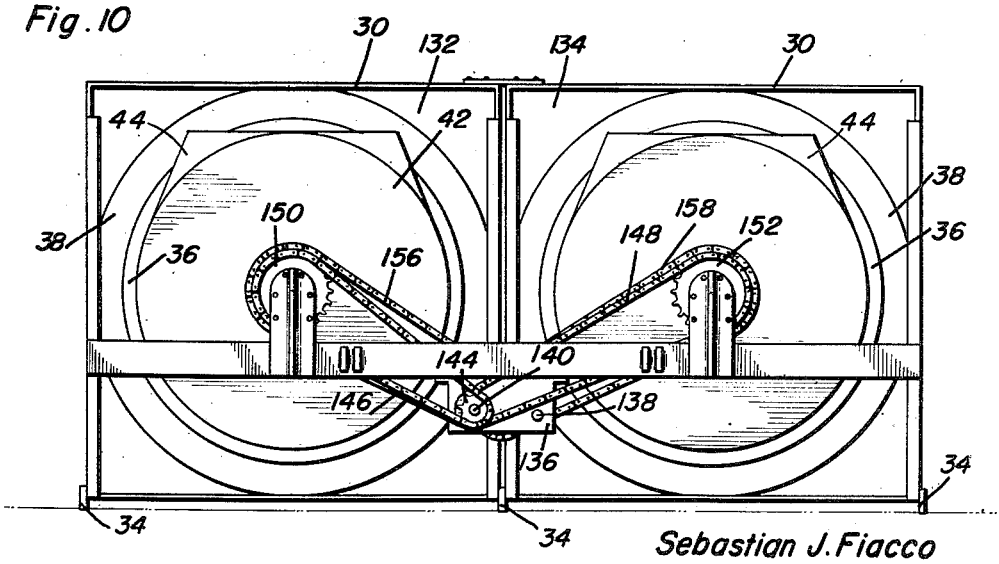
Figure 10 is a rear elevational view of the assembly shown in Figure 9.

Referring now more particularly to Figures 9 and 10 wherein a modified form of the assembly is shown, the assembly illustrated is identical in all essentials to that previously described with the exception that the frame is of wider dimension to accommodate two side-by-side snow gathering assemblies 132 and 134. Each of these assemblies is in turn identical with the above described single assembly and it is to be noted that the only difference in the tandem arrangement resides in the gear box assembly 136 and the particular manner of drive to the center shaft 64 and the quill shaft 70. The gear box 136 is provided with a power input shaft 138 and an output shaft 140 as well as the output shaft 142. The output shaft 140 is provided with a pair of side-by-side sprocket members 144 which drive the chain elements 146 and 148 extending to the sprockets 150 and 152, respectively, for driving the shaft 64 of the tandem unit. The other drive output shaft 142 is provided with a pair of side-by-side sprocket members 154 driving the chains 156 and 158 which are trained about sprockets on the shaft 70 of the tandem unit for driving these latter shafts.

The tandem unit will, of course, be extremely desirable when it is desired to utilize the equipment with heavier trucks or motor machinery and wherein it is desired to clear a relatively large swath of snow from highways or the like. Accordingly, more than two side-by-side units may be utilized for the purpose described.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A rotary snow plow attachment for vehicles comprising a supporting frame and means for mounting the same upon a motor vehicle, a funnel on said frame having snow inlet and outlet openings, a cutter assembly rotatably mounted in said funnel at the inlet opening, a rotary blower assembly on said frame having an intake communicating with said outlet opening of said funnel, an outlet opening connected to said blower assembly, common driving means operatively connected to said cutter and blower assemblies, said common driving means including concentric operating shafts operably connected to said cutter and blower assemblies, said cutter assembly including a plurality of pitched, radial blades, means on the one of said shafts for reversing the pitch of said blades in response to reversal of the drive of said common driving means, said pitch reversing means including cam engaging elements on the shaft which is connected to said blower assembly, a cam element pivoted on each of said blades of said blade assembly, said cam elements being operable to be engaged by said cam engaging element for automatically effecting reversal of pitch of said blades, and stops carried on said blades and arranged to limit the extent of pivotal movement of said blades.

2. The rotary snow plow attachment for vehicles of claim 1, wherein said cutter assembly has a hub, said stops comprise spring urged detents and recesses in said hub and said blades respectively.

References Cited in the file of this patent

UNITED STATES PATENTS

| 317,809 | Leslie | May 12, 1885 |
| 419,149 | Haughawout | Jan. 7, 1890 |
| 450,487 | Haughawout | Apr. 14, 1891 |
| 2,603,007 | Fiacco | July 15, 1952 |